US010154194B2

(12) United States Patent
Gilpin (10) Patent No.: US 10,154,194 B2
(45) Date of Patent: Dec. 11, 2018

(54) VIDEO CAPTURING AND FORMATTING SYSTEM (71) Applicant: Logan Gilpin, Fort Worth, TX (US)

(72) Inventor: Logan Gilpin, Fort Worth, TX (US)

(*) Notice: Subject to any disclaimer, the term of this patent is extended or adjusted under 35 U.S.C. 154(b) by 0 days.

(21) Appl. No.: 14/588,376

(22) Filed: Dec. 31, 2014

(65) Prior Publication Data
US 2016/0191891 A1 Jun. 30, 2016

(51) Int. Cl.
H04N 5/232 (2006.01)
H04N 5/77 (2006.01)
H04N 13/00 (2018.01)
H04N 13/02 (2006.01)

(52) U.S. Cl.
CPC .......... H04N 5/23238 (2013.01); H04N 5/77 (2013.01); H04N 13/0239 (2013.01)

(58) Field of Classification Search
CPC .......... H04N 13/0029; H04N 5/23238; H04N 7/0112; H04N 5/77; H04N 7/0115; H04N 13/0221
USPC ..................................................... 348/36, 42
See application file for complete search history.

(56) References Cited

U.S. PATENT DOCUMENTS

| 7,092,014 | B1 * | 8/2006 | Li | H04N 13/0221 348/211.11 |
| 7,463,280 | B2 | 12/2008 | Steuart, III | |
| 8,749,620 | B1 * | 6/2014 | Knight | H04N 13/0011 348/49 |
| 8,860,816 | B2 * | 10/2014 | Corcoran | H04N 5/217 348/169 |
| 2004/0027451 | A1 * | 2/2004 | Baker | H04N 5/2259 348/46 |
| 2005/0028193 | A1 | 2/2005 | Candelore et al. | |
| 2006/0227417 | A1 | 10/2006 | Grover | |
| 2009/0002849 | A1 | 1/2009 | Kim et al. | |

(Continued)

FOREIGN PATENT DOCUMENTS

| CA | 2496326 A1 | 3/2004 |
| GB | 2455498 A | 6/2009 |
| WO | 2013104718 A2 | 7/2013 |

OTHER PUBLICATIONS

International Search Report and Written Opinion of the ISA (US), dated Mar. 17, 2016, 11 pages.

(Continued)

Primary Examiner — Gelek W Topgyal
(74) Attorney, Agent, or Firm — Law Office of Jeff Williams; J. Oliver Williams (57) ABSTRACT A video capture and formatting system including a plurality of lenses, a digital sensor, and an editing unit. The lenses capture light from a defined viewable area and are curvilinear in nature. The sensor receives the light from the lenses and senses the color, exposure, and travel distance of each photon. The sensor generates image data representing the visual characteristics of the image and the photon travel distance for each pixel. The editing unit processes image data from the sensor and blends the images from each lens together by matching the photon distance around the sides of each lens image data. The editing unit forms a master format having a two dimensional equi-rectangular image with depth perception provided from the photon travel distance of each pixel.

17 Claims, 5 Drawing Sheets (56) References Cited

U.S. PATENT DOCUMENTS

| | | | |
|---|---|---|---|
| 2010/0231593 A1* | 9/2010 | Zhou | G06T 3/4007 |
| | | | 345/428 |
| 2011/0074934 A1* | 3/2011 | Ko | H04N 13/0003 |
| | | | 348/51 |
| 2011/0216158 A1* | 9/2011 | Bigioi | G06T 5/006 |
| | | | 348/36 |
| 2011/0216162 A1* | 9/2011 | Filippini | H04N 11/02 |
| | | | 348/43 |
| 2012/0120111 A1 | 5/2012 | Royal et al. | |
| 2012/0327185 A1 | 12/2012 | Steuart, III | |
| 2013/0128030 A1 | 5/2013 | Georgiev | |
| 2013/0287372 A1 | 10/2013 | Dachiku | |
| 2013/0335521 A1 | 12/2013 | Lin | |
| 2014/0063061 A1* | 3/2014 | Reitan | G09G 3/003 |
| | | | 345/633 |
| 2014/0362178 A1 | 12/2014 | Nadler | |
| 2015/0348580 A1* | 12/2015 | van Hoff | G11B 19/20 |
| | | | 348/38 |
| 2016/0080650 A1* | 3/2016 | Okazawa | H04N 21/4312 |
| | | | 348/36 |

OTHER PUBLICATIONS

International Preliminary Report of Patentability in related International patent application No. PCT/US2015/067585, dated Jul. 4, 2017, 9 pages.

\* cited by examiner

VIDEO CAPTURING AND FORMATTING SYSTEM

BACKGROUND

1. Field of the Invention

The present application relates generally to a video camera and formatting system and, more particularly, to a 360 degree viewing camera and format system playable in multiple formats.

2. Description of Related Art

The standards of the motion picture industry and the way movies are captured and produced is more complex than simply an audience observing a stage play. Current cinematography techniques involve a number of steps when capturing a basic scene. Typically one or more cameras are selectively located to frame up a shot. Each shot requires a degree of effort and time to assemble the set, adjust lighting, locate cameras, and so forth. Various elements must be set prior to filming or altered during the shot, such as: aspect ratios, aperture, exposure, camera focus and lighting. Post editing adjustments are usually minimal. The films are a compilation of multiple shots sequenced and edited in a particular manner.

Conventional camera systems have a number of disadvantages. First, the type of camera system selected can have a great impact on the available playback formats available for viewing. Selected camera systems are necessary to produce certain playback formats for viewing, meaning one camera system does not allow for the production of all playback formats. Secondly, camera systems are typically designed with a particular set of lenses used to capture a desired field of view. The lenses usually include various distortions which are corrected in post editing software after the image has been captured by the digital sensor. This can result in the cropping of data.

Thirdly, playback formats for films are typically in a square aspect ratio for playback ability in cinema theaters and HDTV. Presently there are HD and 4K resolutions for standard broadcast and Cinema movie theaters. The movie industry is promoting a wider curved screen and more resolution. However, no curved capturing devices currently fit this new curved screen format. Standard cinema lenses are already curved, however their curve is based on a particular focal length needed for each shot. This is one area where the visual motion picture industry has its limits.

With respect to capturing 3D content, current 3D content requires two cameras with optics that narrow the field of view directing the audience to gain depth perception, but with the loss of surrounding detail. Newer motion capturing systems allow almost impossible camera movements and visual effects, however this industry is still confined to selected aspect ratios for viewers to observe the motion picture content. These aspects have changed depending on the uses. Television in the 1950's to 2000 were 4:3 squared as we moved into 16:9 and for cinema movie theaters 2.38:1 or 2.40:1 this format is wider to allow audiences to have a wider visual range when viewing.

Furthermore, camera systems using multiple lenses to capture wide or 360 degree views, stitch the views together. 360 degree camera systems represent a new technology and give the ability for viewers to become interactive. Viewers are able to look around 360 degrees from a single location, moving or stationary. Stitching is the combining of multiple photographic images with overlapping fields of view to produce a panorama image. However nearly exact overlaps are necessary to avoid visual distortions in the resulting picture. Stitching uses visual indicators within the overlapping images to try and generate a smooth transition between camera views. Stitching has some limitations. Stitching often results in the need to still edit or modify the actual footage of the picture. This has a tendency to cause distortion in the video. Additionally, stitching is often done in batches where the views are processed by using a preset alignment from a first frame and applying it to multiple others. Small distortions or variations in the first frame get more noticeable on later frames.

There have been prototypes and 360 degree systems that claim 3D capabilities using 6 cameras in all directions, paring them with a left and a right camera totaling 12 cameras, and allowing the left and right of each camera to create depth perception using a software based application to project the direction and yaw the viewer will see. Because of the low resolution and the wide field of view this cannot be achieved in the desired 3D standard audiences are familiar with. Most 360 degree camera systems have very low resolution and have limited ability to be played back at those native resolutions. The majority of 360 degree capturing systems use multiple cameras creating parallaxes and stitching issues with near and far objects between each camera. Some 360 degree camera systems use a cone shape mirror that uses a single chip that only captures 360 degree in the horizontal perspective not in the vertical 360 viewing area or the complete full visual circumference. These cone shaped mirror system are limited to the sensor resolution.

There is a need for an improved camera system. There is also a need for a single camera system configured to produce a singular master format capable of permitting single source capture and multi-formatted playback. Although great strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail.

It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of use in accordance with the present application overcomes one or more of the above-discussed problems commonly associated with legacy camera systems, playback devices, and filming techniques. Specifically, the video capturing and formatting system of the present application acts as a single source point of capture device for a 360 degree full radial view wherein the image data is edited and stored so as to produce a single master format that can be further edited to permit multi-formatted playback. Examples of playback formats are: interactive playback formats, standard playback formats, and specialized playback formats. Each format may be viewed on its own particular playback device or may be viewed via an optional multi-playback format device according to the present application. These and other unique features of the system are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The video capturing and formatting system is illustrated in the associated drawings. The system includes a camera system having a plurality of lens housings, each lens housing containing one or more curvilinear lenses configured to capture imagery from the environment. The camera system converts the imagery into data and selectively transmits that data to an editing unit to generate a two dimensional equi-rectangular image of the environment. The equi-rectangular image is a compilation of image data and distance data of the light captured through the lenses. Image data and distance data is captured for each pixel to provide depth perception and 3D capability. After initial processing, the raw data yields the master format. The master format is editable in nature for the production of a plurality of playback platforms. The editing device is configured to permit secondary editing to adjust features such as visual appearances and scene selection. The master format may be viewed on a playback device particular to a format or on a multi-format playback device adaptable for playback in multiple different formats.

Figure 1:
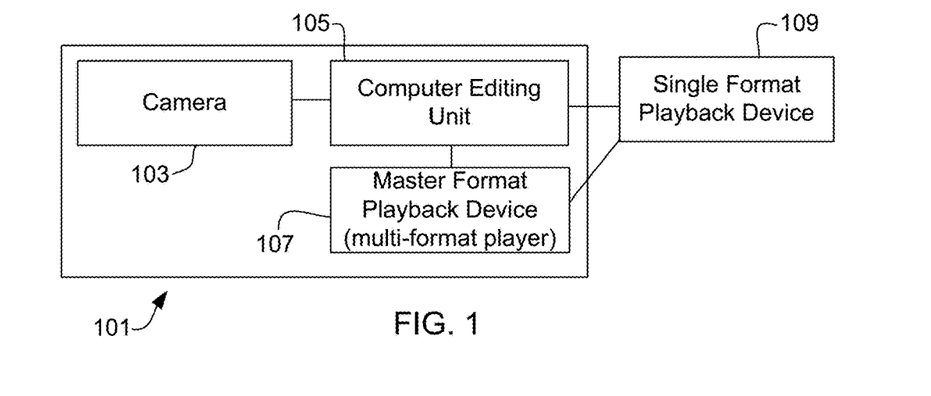
FIG. 1 is a chart of a video capturing and formatting system according to the preferred embodiment of the present application.

Referring now to the drawings wherein like reference characters identify corresponding or similar elements in form and function throughout the several views. FIG. 1 illustrates the video capturing and formatting system 101 as described above. System 101 includes a camera system 103, an editing unit 105, and an optional master format multi-format playback device 107. System 101 is configured to capture imagery from extended viewing angles (i.e. 360 degrees) and generate a master playback format that may be edited to produce one or more individual playback formats for viewing on a playback device 109.

Figure 2:
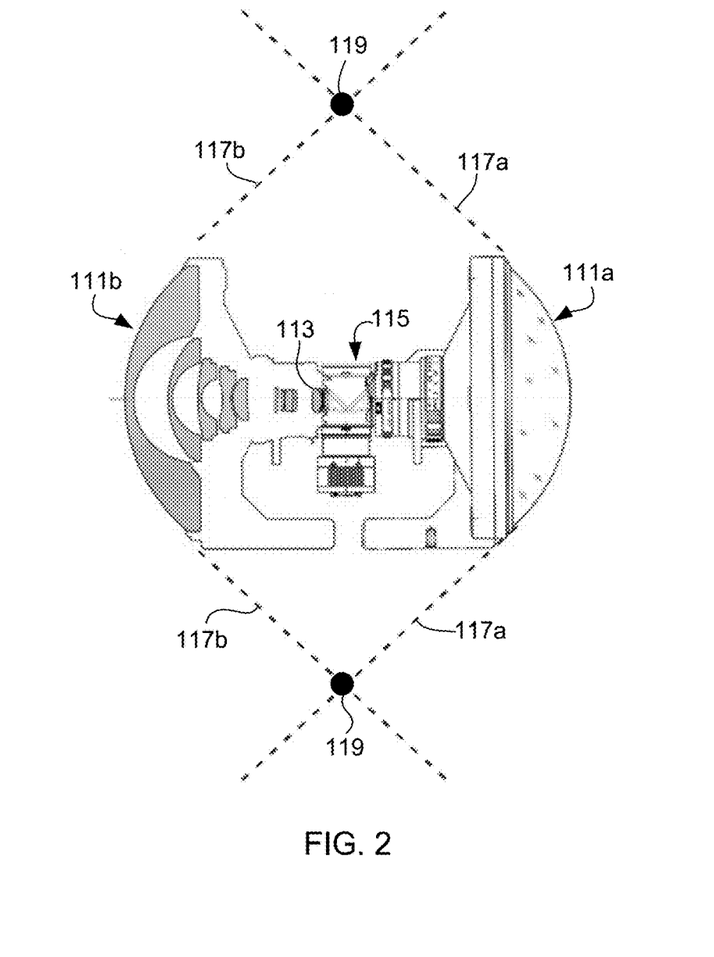
FIG. 2 is a side view of a camera system within the video capturing and formatting system of FIG. 1, the camera system being partially sectioned for visualization of lenses.

Referring now also to FIG. 2 in the drawings, camera system 103 is further illustrated. System 103 is configured to capture light within a selected viewing area and project that imagery onto a digital sensor for recording and generation of image data. System 103 includes a plurality of curvilinear lenses 111a, 111b, an optical correction lens 113, and a digital spatial phase sensor 115. Curvilinear lenses 111a are housed with an accompanying optical correction lens (not shown) within a lens housing. Likewise curvilinear lenses 111b are housed with an accompanying optical correction lens 113 within a secondary lens housing. FIG. 2 illustrates lens 111b as a partial section view to provide a visual illustration of the plurality of lenses making up lenses 111b. Each set of lenses 111a, 111b project an image onto a single sensor, sensor 115.

Light passes through the curvilinear lens 111a, 111b, followed by optical correction lens 113, and is then projected onto a flat surface of sensor 115. Lenses 111a are oriented in an opposing direction to that of lenses 111b, so as to capture a full 360 degree view of the environment. Other embodiments of camera system 103 may orient the lenses so as to decrease the viewable area. Lenses 111a and 111b are configured to provide 360 degree full radial viewing of the environment in both the horizontal and vertical direction. Although lenses may have different curvatures, an example of lenses 111a, 111b are that of hemi-spherically opposing 220 degree lenses.

As seen in FIG. 2, lines 117a, 117b represent the viewing area of lenses 111a, 111b respectively. A viewing intersections 119 occur where the viewing area of each lens 111a, 111b overlaps one another. This viewing intersection occurs around the entire viewing circumference of the two lenses. This overlap results in the occurrence of a parallax between the two images. A parallax is a displacement or difference in the apparent position of an object viewed along two different lines of sight, and is measured by the angle or semi-angle of inclination between those two lines. Corrective actions to fix the parallax will be discussed below.

The optical correction lens (i.e. lens 113) receives the light through lenses 111a, 111b. Discussion related to lens 113 and lenses 111b will apply equally to that of lenses 111a and its corresponding optical correction lens. Lens 113 is configured to adjust the light passing through lenses 111b prior to being projected onto sensor 115. This adjustment is to correct for distortions as a result of using a curvilinear lens. System 103 corrects optical distortions prior to processing the imagery via sensor 105. An example of lens 113 is a rectilinear lens. Lens 113 projects the light from the lenses onto a flat portion of the digital sensor 115 to generate a two-dimensional planar image.

Figure 3:
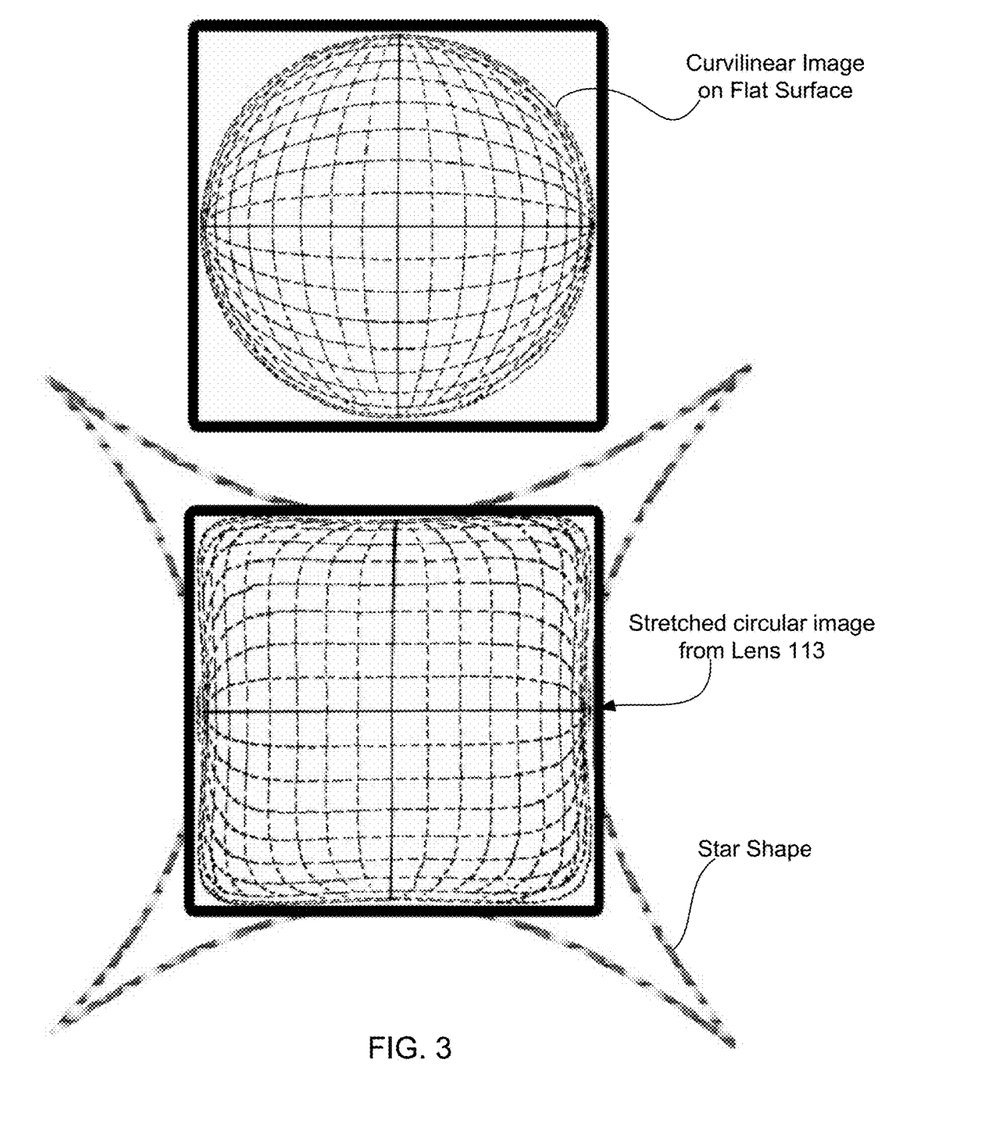
FIG. 3 is a view of the projection of a curvilinear image taken from the lenses of FIG. 2 and projected onto a sensor within the video capturing and formatting system of FIG. 1.
Figure 4:
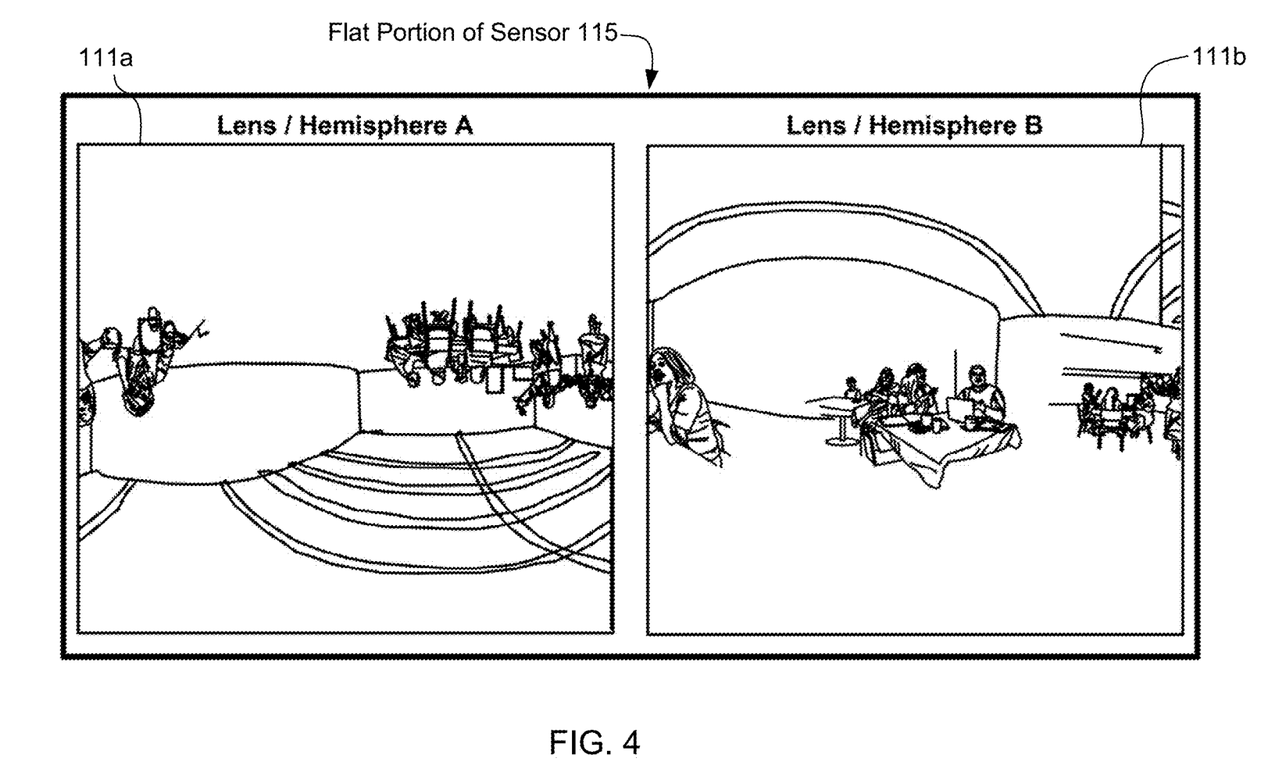
FIG. 4 is an exemplary top view of a flat surface of the sensor of FIG. 2 for receiving the curvilinear image of FIG. 3.

Referring now also to FIGS. 3 and 4 in the drawings, where the effect of using a curvilinear lens (fisheye) with lens 113 is illustrated. An image taken with a curvilinear lens yields a distorted image when viewed on a flat surface (i.e. surface of sensor 115). Straight lines are distorted/curved, especially around the corners. Images would appear as a flattened sphere or a circle. In this application where the viewing angle of lenses 111a, 111b are 220 degrees, there are portions of the viewable area which fail to appear. Those portions are behind the front visible area. Lens 113 is configured to manipulate the light passing through the curvilinear lenses to selectively stretch the edges and corners of the circular image into a rectangular shape. Customarily conversion from a curvilinear lens to a rectilinear lens during post editing can yield images wherein the corners become severely stretched almost forming a star shape. Optical correction lens 113 is configured to correct for distortions and/or perspective issues prior to reaching sensor 115. The light is projected into a relatively square shape on sensor 115 in order to increase the viewable pixel area on sensor 115. Use of lens 113 avoids the need to crop the image and adjusted for perspective.

Each set of lenses 111a and lenses 111b project an image onto the flat surface of sensor 115. FIG. 4 illustrates an exemplary scene as shown as projected onto sensor 115. No cropping of data is necessary within sensor 115. This allows for there to be no specific aspect ratio restriction on the image data formed from sensor 115. Sensor 115 retains all portions of the projected image.

Sensor 115 processes and measures the light as projected and generates image data containing information related to the ultraviolet (UV) spectrum and radiation of photon travel distance for each photon. Sensor 115 is configured to sense and record the level of brightness, contrast, and color of each photon within the light. Additionally, sensor 105 is configured to measure and record the travel distance of each photon relative to system 103. The photon travel distance (distance data) is captured and stored for each pixel in each frame. By collecting and storing the distance data associated with each photon, system 101 is equipped to provide depth perception data to allow the objects within the image data to change depth when the viewer is observing the surroundings. The distance data is used to provide 3D capability to the master format despite being shot in 2D. Also, because system 101 captures the image in 2D, system 101 can maintain exceptionally high resolutions unlike dedicated 3D systems. An example of resolution for sensor 115 may be in the area of 20,000×10,000 pixels. Other resolutions are contemplated.

Editing unit 105 is configured to receive and process the image data (UV data and distance data) from the spatial phase sensor 115 and form a master format adaptable for multi-formatted playback. The master format being a compilation of data (image data) digitally representing the viewing environment in two dimensional space across the entire radial viewing area. Unit 105 receives the data from sensor 115 and is configured with one or more processors to edit and process the image data from its initial raw format (as received from sensor 115) into the master format.

Figure 5:
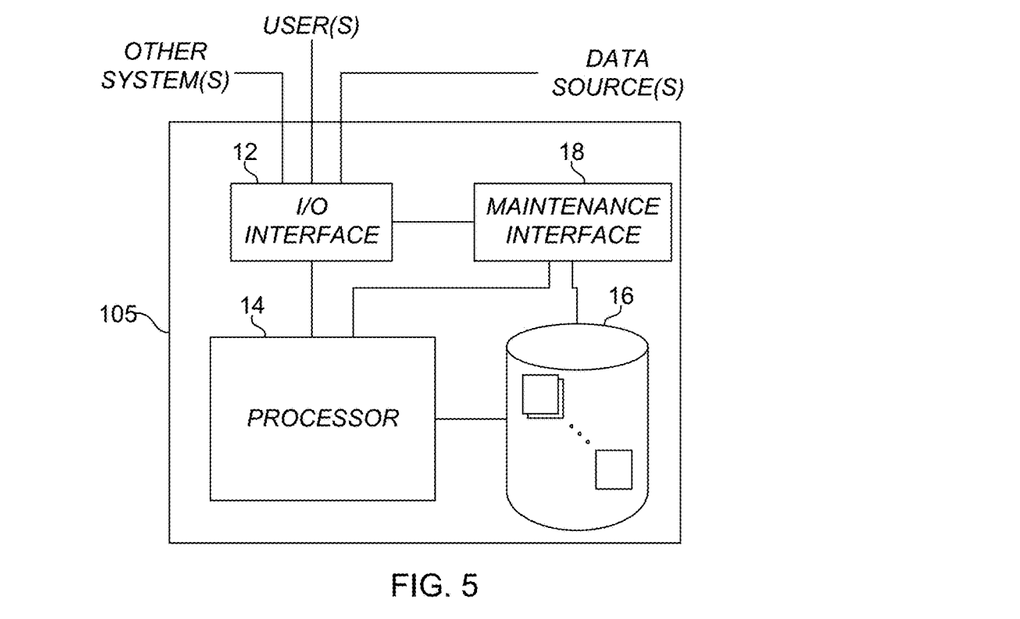
FIG. 5 is a chart of an editing unit of the video capturing and formatting system of FIG. 1.

Referring now also to FIG. 5 in the drawings, a schematic of unit 105 is illustrated. FIG. 5 illustrates an exemplary configuration and design for unit 105 used to receive and process the image data from sensor 115 in order to generate the master format.

The unit 105 includes an input/output (I/O) interface 12, a processor 14, a database 16, and a maintenance interface 18. Alternative embodiments can combine or distribute the input/output (I/O) interface 12, optimization engine 14, database 16, and maintenance interface 18 as desired. Embodiments of unit 105 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example smart phones, electronic tablets, and computer workstations, that are suitable for also performing other tasks. Furthermore the computers and machines may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of unit 105. The I/O interface 12 can be configured for allowing one or more users to input information to unit 105 via any known input device, such as display 113. Examples can include a keyboard, mouse, touch screen, microphone, and/or any other desired input device. Sound may be inputted into unit 105 for editing with the master format and playback formats. The I/O interface 12 can be configured for allowing one or more users to receive information output from unit 105 via any known output device. Examples can include a display monitor, a printer, a speaker, and/or any other desired output device. The I/O interface 12 can be configured for allowing other systems to communicate with unit 105. For example, the I/O interface 12 can allow one or more remote computers to access information, input information, and/or remotely instruct unit 105 to perform one or more of the tasks described herein. The I/O interface 12 can be configured for allowing communication with one or more remote data sources. Raw format data may be viewed and modified via I/O interface 12 to permit initial editing and secondary editing.

The database 16 provides persistent data storage for unit 105. While the term "database" is primarily used, a memory or other suitable data storage arrangement may provide the functionality of the database 16. In alternative embodiments, the database 16 can be integral to or separate from unit 105 and can operate on one or more computers. The database 16 preferably provides non-volatile data storage for any information suitable to support the operation of unit 105. Database 16 stores information used in the generation of the master format and playback formats. Examples may include, sound, exposure, focus, color, pans, zooms, and cut-away shots for example.

The maintenance interface 18 is configured to allow users to maintain desired operation of unit 105. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of processor 14 and/or the I/O interface 12. This can include, for example, software updates and/or administrative tasks such as security management and/or adjustment of certain tolerance settings.

The processor 14 is configured to receive the raw image data from sensor 115 and automatically apply user selected cinematography presets and perform blending of the image data from the two lenses 111*a*, 111*b*. Processor 14 also permits secondary editing, such as the formation and selection of scenes, sound edits, focus adjustments, and so forth. Processor 14 can include various combinations of one or more processors, memories, and software components.

The raw image data provided by sensor 115 to unit 105 is considered in raw form. The represented images as projected onto sensor 115 are not combined prior to transmission to unit 105. Therefore the image data is not formed into the two dimensional equi-rectangular image as seen in the master format. Unit 105 initially processes the image data as stated previously and forms the two dimensional equi-rectangular image by combining the image data from lenses 111*a*, 111*b*.

Unit 105 includes mathematical algorithm software configured to blend the overlapping imagery data from each lens into a singular radial two dimensional equi-rectangular image. The software matches the photon travel distance from overlapping matching pixels within the image data of each lens to compensate for parallax discussed previously. To properly blend the objects captured in the parallax of the images overlapping from the two hemispherical lenses 111*a*, 111*b*, pixel matching and distance data are processed with the mathematical algorithm software to connect the two hemispherical images.

Unit 105 uses the distance data from overlapping matching pixels from each lens 111*a*, 111*b* along with the distance between the two hemispherical lenses 111*a*, 111*b* to complete the blending/merging of the imagery data. This processing is performed for each frame independently from other frames. This prevents distortions or variations in viewing quality seen frequently in batch stitching techniques where a single frame is overlapped without distance data and then used as a preset overlapping value for batches of following frames.

Unit 105 also is configured to apply preset cinematography techniques to the blended image data. The image data is processed by unit 105 to adjust the visual appearance of the pixels, meaning any of lighting, exposure, focus, and aperture, to name a few. Once preset cinematography techniques are applied and blending is performed, a master format is generated. The master format generated by system 101 is a compilation of data, including: visual data, sound data, spatial data, ultraviolet light data and so forth, related to the visual imagery captured by the lenses 111*a*, 111*b*. Additionally, the master format is a two dimensional curved model where each pixel is located at the appropriate distance as measured by sensor 115. For example, if the 360 view was a ball, the ball would be textured to show depth as opposed to being smooth. This "texture" allows for depth of field and 3D capabilities.

Once this master format data is obtained, it is viewed in a motion picture sequence for previewing on standard editing displays to allow for post or secondary processing. The master format data may be used to generate one or more playback formats, including interactive formats 121, standard formats 123, and specialized formats 125 (see FIG. 6). When observing the captured content of the master format during playback with all of the data in the master format, many playback formats can be produced for all visual playback platforms.

System 101 acts as a single source capturing device. System 101 captures the entire scene in the full radial view, 360 degrees in the horizontal and vertical in one take and provides multiple angles and perspectives with the ability to virtually light, change lenses, aperture, and exposure for each angle of shots later in post-production editing. This simplifies the need to customarily frame up shots individually, and adjust lens aspects, aperture, and exposure for each shot. Additionally this decreases the time and expense of needing to take down and setup portions of the set for the different shots.

Selected scenes are captured and are ordered sequentially to create a particular playback sequence are edited to produce a particular playback format. A playback sequence can be created to work for any playback device. Any type of known camera or cinematography editing display can utilize this master format data to produce multiple camera angles and aspect ratios as well as focus adjustments, exposure, and placed lighting. The software from unit 105 may permit for the creating of preset movements integrated in the master format data to create preset pans, zooms, cut-aways, and hand held moments that can be altered by the viewer. Standard cinematography techniques may also be applied during secondary processing.

Figure 6:
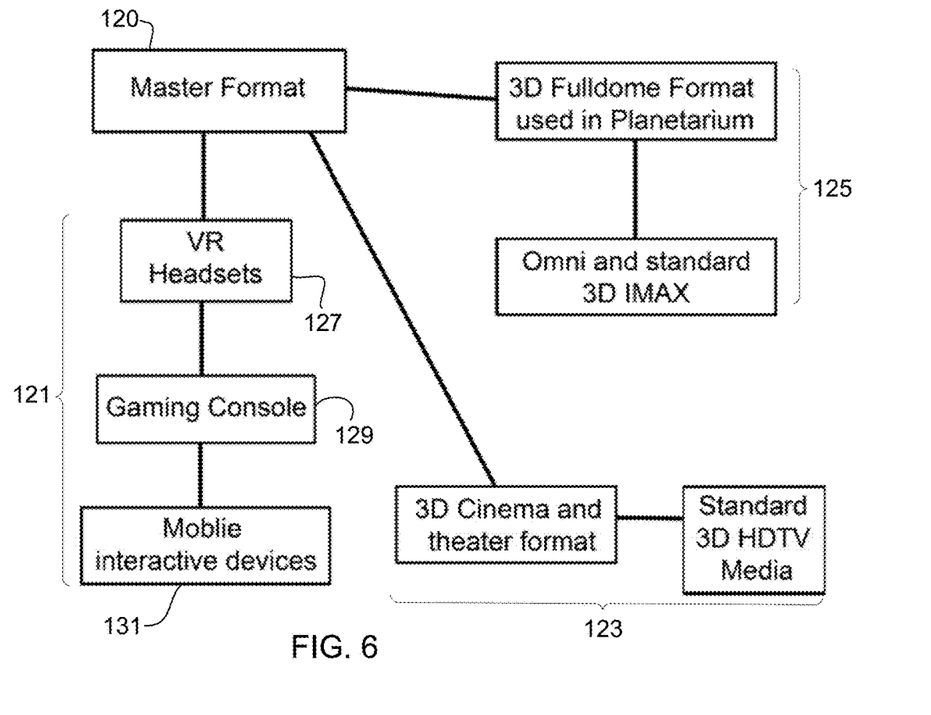
FIG. 6 is a chart of playback formats producible through the video capturing and formatting system of FIG. 1.

Referring now to FIG. 6 in the drawings, a chart illustrating exemplary playback formats are provided. Editing may be performed wherein the master format 120 is modified or edited to produce a singular playback format for viewing on/through device 109. Master format 120 may also be edited to contain multiple playback formats as separate options for viewing directly within the master format itself. In such an instance, system 101 may also include multiformat playback device 107. Device 107 is configured to store master format 120 containing one or more formats 121, 123, 125. Device 107 is configured to detect the type of playback device coupled to it and automatically transmit the appropriate playback format for that device (i.e. device 109). Where multiple playback formats are appropriate for playing on a particular device 109, then a user is given an option to select, or device 109 may select the highest quality format, or device 109 may follow a user defined preset selection. It is important to note that the various formats are derived from the master format and are therefore themselves a compilation of data particularly sequenced and adjusted to provide particular capabilities, such as those related to aspect ratio, resolution, focus, plot sequences, and so forth, when viewed through a playback device 109.

Figure 7:
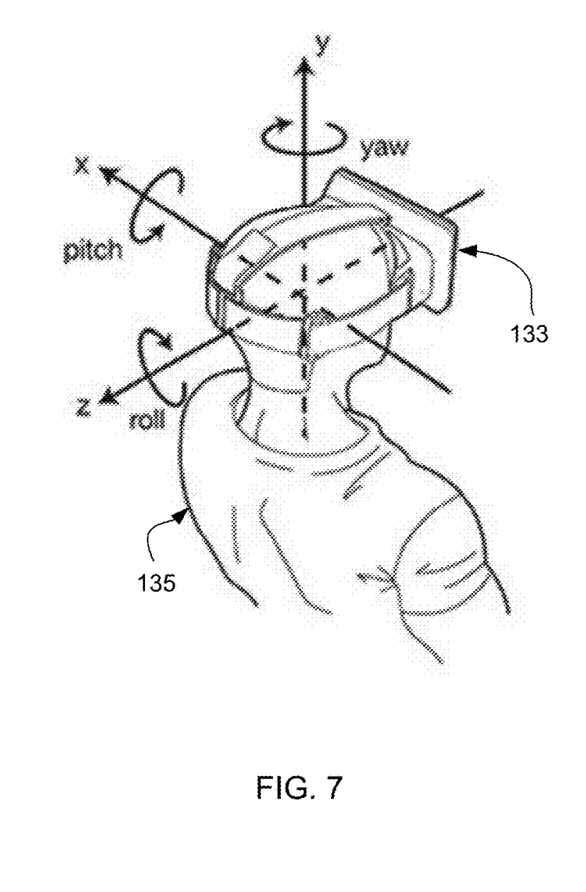
FIG. 7 is a perspective view of a head mounted display playing a playback format in FIG. 6.
Figure 8:
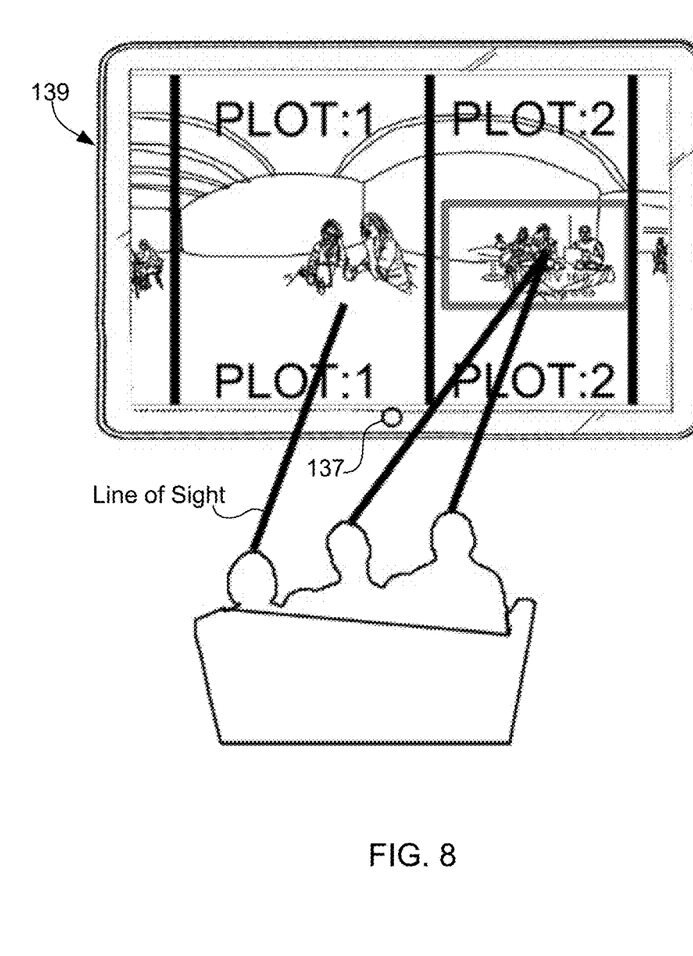
FIG. 8 is an exemplary view of a viewing device playing a playback format in FIG. 6.

Examples of interactive formats 121 are virtual reality (VR) system formats 127, gaming consoles formats 129, and mobile interactive device formats 131. Referring now also to FIGS. 7 and 8 in the drawings, a virtual reality system is illustrated. VR formats 127 are configured to operate with any number of different head mounted displays 133. Display 133 has one or more accelerometers to track accelerometer data in the xyz axis. This data interacts with the format 127 to adjust the field of view for the user 135. Another feature of format 127 is the ability to utilize the distance data for each pixel and provide 3 dimensional capable views with focusable depth perception for the user 135.

In instances where the virtual reality system includes a retinal tracking device, other features are available within format 127. A retinal tracking device may be implemented within a display 133 or at a remote location as seen more clearly in FIG. 8. The retinal tracking device 137 is illustrated next to the viewing device 139. System 101 may further include display 133 and retinal tracking device 137 (coupled to or separate from viewing device 139).

Retinal tracking device 137 is configured to selectively track the line of sight of a user. By detecting the line of sight of a user, system 101, including format 127 is configured to provide additional advantages and features. Format 127 is configured to permit the selective adjustment or change of focus of portions within a viewing area. Format 127 can selectively adapt the focus to the line of sight of the user. For example, as the user changes his/her sight from an object in the foreground to that of an object in the background, format 127 is configured to automatically permit the adjustment of the focus. Such capability is permitted with displays 133 and viewing devices 139.

Additionally, format 127 is configured to permit the selective resolution of objects within a viewing area. Where retinal tracking device 137 is used, selective resolution adjustments may be made to coincide with the line of sight of the user. Use of the selective resolution adjustments and selective focus adjustments allow for image quality increases in the areas that are important for the user. Energy, bandwidth, and speed of processing may be positively affected by these features.

Another feature that arises from the use of retinal tracking device 137 is the ability to engage multiple nested plot lines within format 127. As shown on viewing device 139, plot 1 and plot 2 are illustrated. One user is watching the events within plot 1 and the other two users are watching the events within plot 2. Format 127 is configured to contain nested plot lines to permit the adjustment of the plot according to the directed interest of the user as seen and detected by the user's line of sight. For example, where a single user was watching format 127 the scenes of the movie may be selectively adjusted to correspond to the interest of the user. A user could then gain additional information by re-watching the movie. Endings of the movie may be different. Multiple plot lines would allow for greater depth and interaction between the user and the movie plot. Where multiple users are watching scenes may be modified as the group together shows interest. Format 127 would permit a change in plot lines based upon a predetermined line of sight at particular areas. It is understood that sound may also be adjusted to coincide with line of sight and plot lines. In a part of the movie where a crow is shown, sound may be selectively amplified for a particular user's hearing based upon their line of sight. Multiple user's may gather differing stories and information despite watching the same movie from format 127.

Referring now back to FIG. 6 in the drawings. Gaming format 129 are also configured to support the selective resolution feature and selective focus features as described with format 127. Even though not connected to retinal tracking device 137, portions of format 129 not in view may be selectively dumbed down (lower resolution) and selectively loaded. For example, when data is not in view of the screen, the data is selectively not loaded or may drastically decrease the resolution. Additionally, a user is able to input changes to the field of view by controlling the area viewed during the game sequences. Format 129 is configured to follow a preset playing sequence but will permit and support interactive user changes. The resolution is increased in the desired field of view as well as local sound position data and spatial audio. Format 129 the manipulates the aspect ratio of the camera's viewing angle and viewing aspect ratio of the master format 120.

Format 131 is configured to operate with mobile devices. Format 131 is capable to adapt to the viewing device's display limitations. Format 131 permits 3 dimensional or non 3 dimensional viewing and the ability to utilize xyz accelerometer data similar to that described above with format 127. Format 131 is also able to support selective resolution adjustments and line of sight features as described above where the mobile device is so equipped.

Standard formats 123 are those related to cinema theaters and home media use, such as digital videos, high definition, and so forth. Formats 123 are suitable for a plurality of aspect ratios and contain a plurality of preset cinematography pans, cut-aways, and zooms. Formats 123 may be equipped and operable with selective line of sight features described above where retinal tracking is available. Multiple sequences are stored within formats 123 to coincide with each plot line (similar to that of format 127).

Master format 120 may be converted into formats 125 suitable for playback with large scale and ultra high definition devices. Examples include planetariums having curved screens, IMAX and Omni video formats. Like formats 121 and 123, formats within the specialized format group 125 are configured to contain preset cinematography pans, cut-aways, and zooms to provide a particular playback sequence. Aspect ratios may be selectively chosen based upon the particular playback device. Square aspect ratios are permitted for use as seen with IMAX films.

Although system 101 is described as providing a 360 degree full radial view of the environment through a plurality of lenses unitizing a single sensor 115, it is understood that other embodiments may elect to apply a single sensor for each lens. In such an embodiment, the single sensor is configured to only receive the imagery from a single lens. Additionally, system 101 is configured to also operate where the viewing angle is less than the full radial view (360 degrees)

The current application has many advantages over the prior art including at least the following: (1) single source capture for 360 degree viewing area with two lenses and a single sensor; (2) pre-sensor adjustment of optical distortions; (3) no cropping of data when converting from curvilinear to a 2 dimensional projections of the curved viewing imagery; (4) detection and assigning of photon travel distance to each pixel; (5) formation of two dimensional equi-rectangular image containing distance data for each pixel; (6) formation of a master format configured to produce multiple playback formats; (7) blending of overlapping imagery based upon the distance data of each pixel; and (8) a user defined depth of field.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A video capturing and formatting system, comprising:
   a plurality of lenses coupled together so as to capture radial imagery of the environment;
   a spatial phase sensor configured to receive the imagery from the plurality of lenses and sense the color, exposure, and distance of travel for each photon in the imagery, the spatial phase sensor configured to generate image data representing the imagery of each of the plurality of lenses, the imagery being captured in 2D so as to maintain increased resolution for 2D viewing, the distance of travel for each photon being stored to also permit the generation of the imagery in 3D; and
   an editing unit configured to receive and process the image data to generate an editable master format configured to produce multiple playback formats in either one or both of 2D and 3D format for use on selected playback devices, the master format being a compilation of image data representing the radial imagery data in three-coordinate space, the editing unit including mathematical algorithm software configured to blend the overlapping imagery data from the plurality of lenses into a singular radial two dimensional equi-rectangular image, the software aligns the overlapping imagery data from the plurality of lenses by matching the photon distance of travel for each photon from overlapping matching pixels within the radial imagery of each lens, the processing of the radial imagery data of each lens is performed independently for each frame;
   wherein the master format permits the generation of image data into both 2D and 3D viewing formats and allows for each viewing format to be viewable on a plurality of the playback devices for viewing directly within the master format itself without the need for reprocessing for generation of the 2D and 3D viewing formats.

2. The video capturing system of claim 1, wherein the plurality of lenses are configured to receive imagery data a full 360 degrees in both the horizontal and vertical directions.

3. The video capturing system of claim 1, further comprising:
   an optical correction lens configured to correct for optical distortions in the plurality of lenses and distort the un-cropped imagery onto a flat surface of the spatial phase sensor, so as to increase the viewable pixel area and eliminate restrictions in the imagery data with respect to a specific aspect ratio.

4. The video capturing system of claim 1, wherein the viewable area of each lens overlaps thereby creating a parallax.

5. The video capturing system of claim 4, wherein the blending occurs for each individual frame without reference to a prior frame preset.

6. The video capturing system of claim 1, wherein the imagery data of each lens is captured in two dimensions, the master format being capable of generating a three dimensional playback format by combining the equi-rectangular image and the photon travel distance of each pixel.

7. The video capturing system of claim 1, wherein the master format is configured to permit a user defined depth of field.

8. The video capturing system of claim 1, wherein the master format is configured to accept secondary processing to form a selected playback format.

9. The video capturing system of claim 8, wherein secondary processing includes making an adjustment to the focus of the imagery data.

10. The video capturing system of claim 8, wherein the editing unit is configured to accept preset movements integrated into the master format to generate a particular playback format.

11. The video capturing system of claim 8, wherein the master format is configured to include multiple playback formats.

12. The video capturing system of claim 8, wherein the master format is configured to accept nested plot lines configured to permit a user the ability to select a particular plot, the playback format including a plurality of plots.

13. The video capturing system of claim 1, further comprising:
   a multi-format playback device configured to store the master format, the master format being edited to contain a plurality of playback formats, the multi-format playback device configured to couple to a playback device, the multi-format playback device configured to detect the type of playback device and transmit the corresponding playback format for the particular playback device.

14. A method for producing an editable master format to permit multi-formatted playback, comprising:
   locating a plurality of lenses in a selected orientation to each other, the plurality of lenses configured to capture imagery of the environment within a specific viewing area;
   transmitting imagery data of the environment as captured from the plurality of lenses to a spatial phase sensor, the imagery being captured in 2D so as to maintain increased resolution for 2D viewing;
   blending the imagery data from the plurality of lenses into a two dimensional equi-rectilinear image;
   detecting and assigning distance data by detecting photon travel distance for each pixel within each frame, the distance data providing depth perception, the distance of travel for each photon being stored to also permit the generation of the imagery in 3D;
   blending overlapping imagery data from the plurality of lenses into a singular radial two dimensional equi-rectangular image, the software aligns the overlapping imagery data from the plurality of lenses by matching the photon distance of travel for each photon from overlapping matching pixels within the radial imagery of each lens, the processing of the radial imagery data of each lens is performed independently for each frame;

processing the equi-rectangular image and applying preset cinematography techniques into each frame; and generating a master format, the master format permits the generation of image data into both 2D and 3D viewing formats and allows for each viewing format to be viewable on a plurality of the playback devices, viewing in each format being done directly within the master format itself.

15. The method of claim 14, wherein the distance data is measured by the spatial phase sensor and assigned to each pixel.

16. The method of claim 14, further comprising:

stretching the imagery data into the equi-rectangular image to avoid cropping, thereby retaining all pixels of each frame.

17. The method of claim 14, wherein the overlapping imagery data creates a parallax.

* * * * *